(12) United States Patent
Kuck et al.

(10) Patent No.: US 12,411,039 B2
(45) Date of Patent: Sep. 9, 2025

(54) SYSTEM AND METHOD FOR MONITORING CONSUMABLE MATERIAL QUANTITIES

(71) Applicant: Ford Global Technologies, LLC, Dearborn, MI (US)

(72) Inventors: Detlef Kuck, Inden (DE); Marcel Grein, Geilenkirchen (DE); Jeroen Lem, Wittem (NL)

( * ) Notice: Subject to any disclaimer, the term of this patent is extended or adjusted under 35 U.S.C. 154(b) by 423 days.

(21) Appl. No.: 18/152,324

(22) Filed: Jan. 10, 2023

(65) Prior Publication Data
US 2023/0221168 A1 Jul. 13, 2023

(30) Foreign Application Priority Data
Jan. 10, 2022 (DE) .......................... 102022100339.6

(51) Int. Cl.
| | | |
|---|---|---|
| G01G 19/414 | (2006.01) | |
| G01G 19/42 | (2006.01) | |
| G06Q 10/087 | (2023.01) | |

(52) U.S. Cl.
CPC .......... *G01G 19/414* (2013.01); *G01G 19/42* (2013.01); *G06Q 10/087* (2013.01)

(58) Field of Classification Search
CPC ...... G01G 19/414; G01G 19/42; G01G 19/40; G06Q 10/087; G06N 20/00
USPC .......................................................... 177/1
See application file for complete search history.

(56) References Cited

U.S. PATENT DOCUMENTS

| | | | | |
|---|---|---|---|---|
| 5,671,362 A | * | 9/1997 | Cowe | G07F 7/00 340/568.1 |
| 7,299,103 B1 | * | 11/2007 | Dye | B29C 44/182 700/171 |
| 8,364,563 B2 | * | 1/2013 | Choiniere, Sr. | G06Q 10/06 705/28 |
| 8,441,365 B2 | * | 5/2013 | Jones | G01G 19/414 340/541 |
| 9,165,316 B2 | * | 10/2015 | Tiano | G05B 19/41875 |
| 2002/0161652 A1 | * | 10/2002 | Paullin | G06K 17/00 705/22 |
| 2008/0106762 A1 | * | 5/2008 | Mullender | G03G 21/02 358/1.16 |
| 2015/0030417 A1 | * | 1/2015 | Boehm | G01G 13/02 53/507 |

* cited by examiner

*Primary Examiner* — Jacques M Saint Surin
(74) *Attorney, Agent, or Firm* — Emily Drake; Eversheds Sutherland (US) LLP

(57) ABSTRACT

The disclosure relates to a system for monitoring consumable material quantities, having at least one loading plate having an upper side providing a loading surface, at least two weight sensors arranged spaced apart from one another on a lower side of the loading plate, and at least one monitoring electronics unit connected or connectable to the weight sensors. To make this monitoring more cost-effective and technically simpler, the system has at least two containers arranged adjacent to one another on the upper side of the loading plate for accommodating a quantity of a consumable material in each case, wherein the monitoring electronics unit is configured to ascertain from sensor signals of the weight sensors, generated before and after consumable material is taken from one of the containers, from which container the consumable material has been taken and/or which quantity of the consumable material has been removed.

9 Claims, 4 Drawing Sheets

SYSTEM AND METHOD FOR MONITORING CONSUMABLE MATERIAL QUANTITIES

CROSS-REFERENCE TO RELATED APPLICATIONS

The applications claims priority to and the benefit of German Application No. DE 102022100339.6, filed Jan. 10, 2022, which is hereby incorporated by reference herein in its entirety.

FIELD OF THE INVENTION

The disclosure relates to a system for monitoring consumable material quantities.

BACKGROUND

Tools and various consumable materials, for example, screws, nails, and the like, are often carried along in utility vehicles. Such consumable materials are viewed as basic equipment of a utility vehicle, since they are regularly required. It is therefore desirable to always have sufficient consumable material in the utility vehicle.

However, the users of utility vehicles often do not accurately know the quantities of consumable materials in the utility vehicles. It therefore regularly occurs that they run out of consumable materials during their work, although they have presumed that they have sufficient consumable materials in reserve in the utility vehicle. In such situations, the users have to interrupt their current work and, for example, drive to the wholesaler to refill consumed consumable materials. For this reason, users of utility vehicles have interest in a solution which assists them in the monitoring of consumable material quantities.

In the case of larger containers in the utility vehicle, which contain larger articles, it is possible to measure their weight, for example, by means of a pressure pad, to be able to estimate the quantity of the articles located in the container. In the case of a large number of smaller containers in a row or in the case of drawers having many compartments for small articles, however, it is not reasonable for reasons of cost to equip each small container or each compartment with a separate weight sensor in each case.

U.S. Pat. No. 10,853,862 B2 discloses a method for initiating a vending session using an in-vehicle vending device to provide a user with access to one or more articles, wherein the vending session is initiated when the user is linked to a journey. The vending session is considered ended when the vending device is closed and at least one article has been taken from the vending device by the user. The method includes identifying this taken article based on sensor data from the vending device. The method moreover comprises sending a confirmation of taking the article to the user.

DE 10 2018 215 870 A1 relates to a method for operating a material stock management system in a vehicle having at least two actuatable storage devices, in which a material stock list is provided, by which at least one item of content information is assigned to each of the storage devices. A beginning of carrying out an order is detected, while the order is carried out, a content change of the storage devices is detected and the material stock list is updated on the basis of the detected content change.

U.S. Pat. No. 10,198,710 B1 discloses a use of sensors for collecting items of information about articles at a storage location. Weight sensors can be used for collecting weight data, while capacitive sensors can detect the presence of at least one article or the grasping of a user in the direction of the storage location. Data of a capacitive sensor can be used to determine that an activity takes place at the storage location, and to trigger the processing of weight data of a weight sensor. Taking the article from the storage location can be ascertained in this way.

WO 2006/116 665 A1 discloses a system for detecting and reporting the presence and/or the weight of inventory objects. The system has a storage unit having a surface for storing inventory objects, one or more sensors positioned on the surface, and a reporting unit for receiving and transmitting a first signal. The sensors can detect one or more signals and send them to the reporting unit, which displays the presence and/or the weight of inventory objects on the surface. The reporting unit then transmits this signal to a controller, which, on the basis of the presence data and/or weight data, determines the presence of objects on the surface, the weight of objects on the surface, and/or the pattern of the objects on the surface. The controller can thus determine the identity and quantity of the objects in the storage unit.

The disclosure is based on the object of providing more cost-effective and technically simpler monitoring of consumable material quantities.

SUMMARY

An object is achieved according to the disclosure by a system having the features of an embodiment, which has at least two containers arranged adjacent to one another on the upper side of the loading plate, each for accommodating a quantity of a consumable material, wherein the monitoring electronics unit is configured to ascertain from sensor signals of the weight sensors generated before and after consumable material is taken from one of the containers, from which container the consumable material has been taken and/or which quantity of the consumable material has been removed.

It is to be noted that the features and measures listed individually in the following description can be combined with one another in any technically reasonable manner and can disclose further embodiments of the disclosure. The description additionally characterizes and specifies the disclosure in particular in conjunction with the figures.

According to the disclosure, each container does not have to be provided with a separate weight sensor in order to measure the weight of the consumable material quantity located in the container and to be able to ascertain the quantity of the consumable material located in the container therefrom. Instead, it is sufficient to arrange at least two weight sensors on the lower side of the loading plate and to position the assembly thus formed above the weight sensors on an underlying surface, for example, of a utility vehicle, even if the system according to the disclosure has a large number of containers. The number of the components required for monitoring the consumable material quantities, in particular weight sensors, can therefore be reduced by the disclosure, due to which the system according to the disclosure is made significantly less technically complex, which results in an advantageous cost reduction.

A consumable material is to be understood in the scope of the disclosure as articles which are consumed in the course of a service rendered, for example, nails, screws, nuts, washers, and the like. Such consumable materials are generally carried along in large quantities in a utility vehicle.

The loading plate can be produced partially or completely from a metal, a metal alloy, a plastic, or a composite material. The loading plate is used for transferring forces from consumable material located in the containers to the weight sensors. The respective container can in itself have a container bottom here and can be placed as a whole on the loading plate. Alternatively, the container bottom of the respective container can be formed by the loading plate. The loading plate can be, for example, a bottom of the drawer having compartments formed by adjacent containers, wherein adjacent containers or compartments can have shared walls. In particular consumable materials of different types can be provided in the containers, so that the consumable materials are provided sorted according to their type. The containers can partially also be arranged above the respective weight sensor or on a section of the loading plate protruding beyond the respective weight sensor. In this case, the weight sensors can also measure negative forces. The weight sensors can be fixedly connected to the loading plate. Alternatively, the weight sensors may not be fastened to the loading plate, wherein the loading plate can simply be laid on the weight sensors, for example.

The monitoring electronics unit can evaluate sensor signals of the weight sensors in discrete time steps or continuously. Of course, the weight load of the weight sensors changes when a consumable material article is taken from a container, and does so more strongly the closer the container is arranged to a weight sensor. The monitoring electronics unit can thus ascertain, from sensor signals of the weight sensors generated before and after one or more consumable material articles are taken from one of the containers, from which container the consumable material article or articles has or have been taken and/or which quantity of the consumable material articles has been removed from the container. For this purpose, the monitoring electronics unit can additionally take into consideration possible items of geometric information on distances of the individual containers to the respective weight sensor.

The respective weight sensor can be designed as a conventional force transducer.

The system according to the disclosure thus enables monitoring of consumable material quantities exclusively on the basis of sensor signals of a minimal number of weight sensors. The system according to the disclosure can be installed, for example, in a storage device of a utility vehicle, wherein the storage device or the utility vehicle is thus also a subject matter of the present disclosure.

According to one advantageous embodiment, the containers are arranged in a row on a section of the loading plate lying between the weight sensors. In this case, for example, a relatively large number of containers can be set up in a row on the loading plate. Two weight sensors arranged at end sections of the loading plate opposite to one another can be sufficient to implement this embodiment, which is accompanied by a substantial cost reduction.

According to a further advantageous embodiment, the loading plate is made rectangular, wherein at least one weight sensor is arranged at each corner region of the loading plate and the containers are arranged in a plane distributed on a section of the loading plate lying between groups of weight sensors which are arranged on opposite sides of the loading plate. In this case, the loading plate can be the bottom of a drawer having multiple compartments in the plane, wherein the compartments are formed by the containers arranged distributed in the plane. The smallest possible number of weight sensors can also be used in such a storage unit in the form of a drawer having multiple compartments or containers, which is accompanied by minimization of costs. The containers can be arranged, for example, distributed like a matrix in the plane. Alternatively, the containers can be arranged irregularly distributed in the plane. Containers of different sizes can also be used here.

According to a further advantageous embodiment, the monitoring electronics unit is configured to compare the ascertained quantity of the consumable material to a predetermined minimum value and to generate and output a messaging signal if the ascertained quantity of the consumable material falls below the minimum value. In this way, it can be displayed to the user of a warehouse or utility vehicle in a timely manner that a consumable material has to be refilled. The messaging signal can be made acoustically and/or optically perceptible to the user, for example.

According to a further advantageous embodiment, the system has at least one human-machine interface connected or connectable to the monitoring electronics unit, via which it can be input which consumable material type and/or consumable material quantity has been loaded in the respective container. In this way, items of information are provided to the system, which improve the accuracy of the monitoring.

According to a further advantageous embodiment, the monitoring electronics unit is configured for machine learning. The accuracy of the monitoring of the respective consumable material quantity can also be improved in this way.

An above object is moreover achieved by a method having the features of an embodiment, according to which a quantity of a consumable material is loaded in each case into at least two containers arranged adjacent to one another on the upper side of the loading plate and it is ascertained from sensor signals of the weight sensors, generated before and after consumable material is removed from one of the containers, from which container the consumable material has been taken and/or which quantity of the consumable material has been removed.

The advantages mentioned above with reference to the system are linked accordingly to the method. In particular, the system according to one of the above-mentioned embodiments or a combination of at least two of these embodiments with one another can be used to carry out the method.

According to one advantageous embodiment, the ascertained quantity of the consumable material is compared to a predetermined minimum value and a messaging signal is generated and output if the ascertained quantity of the consumable material falls below the minimum value.

According to a further advantageous embodiment, the consumable material type and/or consumable material quantity loaded into the respective container is input via at least one human-machine interface.

BRIEF DESCRIPTION OF THE DRAWINGS

The disclosure will now be explained with reference to a drawing. In the drawing.

Identical parts are always provided with the same reference signs in the different figures, because of which they are generally also only described once.

DETAILED DESCRIPTION

The present disclosure relates to a system for monitoring consumable material quantities, having at least one loading plate having an upper side providing a loading surface, at least two weight sensors arranged spaced apart from one another on a lower side of the loading plate, and at least one monitoring electronics unit connected or connectable to the weight sensors. Moreover, the disclosure relates to a method for monitoring consumable material quantities by means of at least one loading plate, which has an upper side providing a loading surface, and at least two weight sensors arranged spaced apart from one another on a lower side of the loading plate. These methods and the teachings of this disclosure can be implemented by a processor executing software stored in memory.

Figure 1:
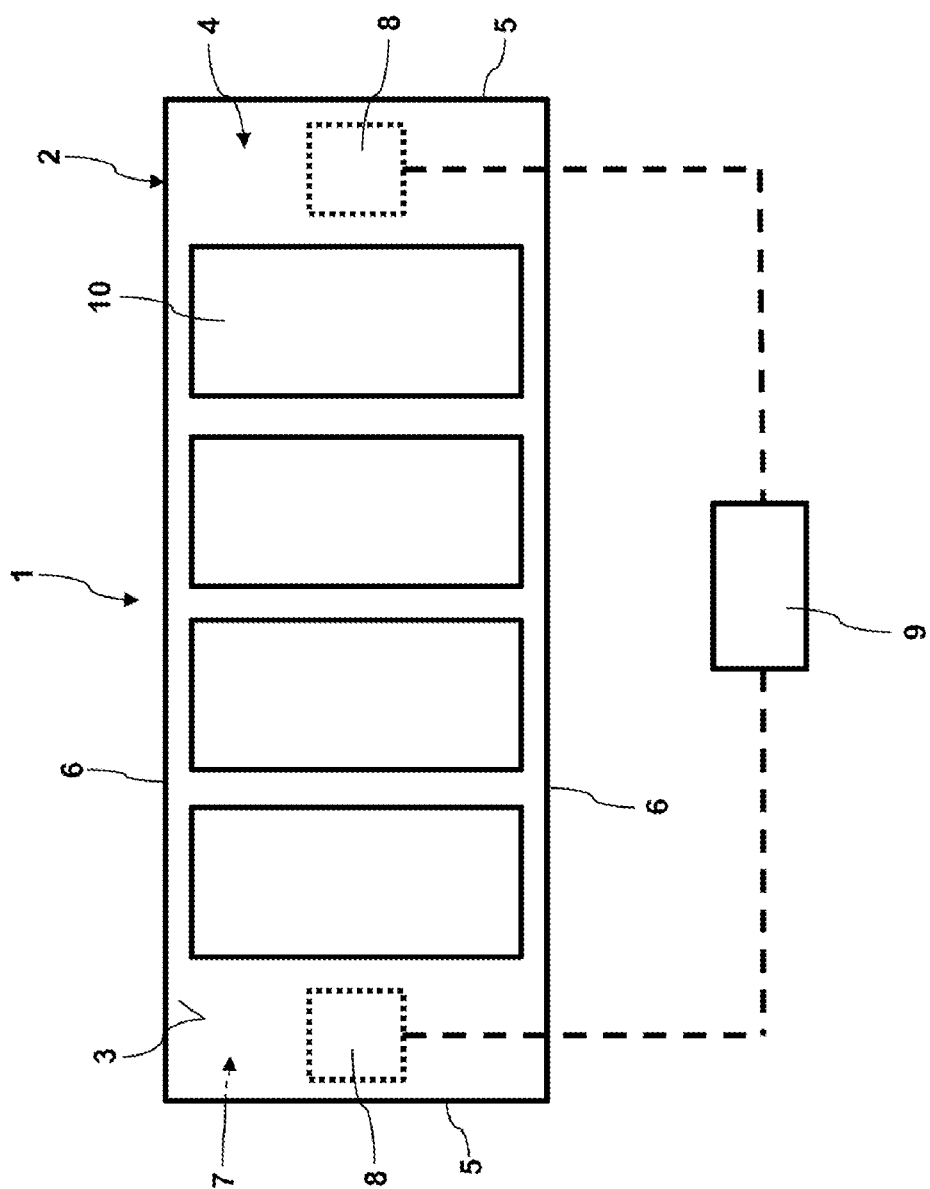
FIG. 1 shows a schematic illustration of an exemplary embodiment of a system according to the disclosure.

FIG. 1 shows a schematic illustration of an exemplary embodiment of a system 1 according to the disclosure for monitoring consumable material quantities (not shown).

The system 1 has a rectangular loading plate 2 having an upper side 4 providing a loading surface 3. The loading plate 2 has two narrow sides 5 opposite to one another and two long sides 6 opposite to one another, which connect the narrow sides 5 to one another.

Moreover, the system 1 has two weight sensors 8 arranged spaced apart from one another on a lower side 7 of the loading plate 2.

In addition, the system 1 has a monitoring electronics unit 9 connected or connectable to the weight sensors 8.

Furthermore, the system 1 has four containers 10 arranged adjacent to one another on the upper side 4 of the loading plate 2, each for accommodating a quantity of a consumable material (not shown). The containers 10 are arranged in a row on a section of the loading plate 2 lying between the two weight sensors 8.

The monitoring electronics unit 9 is configured to ascertain from sensor signals of the weight sensors 8, generated before and after consumable material is taken from one of the containers 10, from which container 10 the consumable material has been taken and/or which quantity of the consumable material has been removed.

Moreover, the monitoring electronics unit 9, which may include a process that executes software stored in memory associated therewith, can be configured to compare the ascertained quantity of the consumable material to a predetermined minimum value and to generate and output a messaging signal if the ascertained quantity of the consumable material falls below the minimum value. Furthermore, the monitoring electronics unit can be configured for machine learning.

Furthermore, the system 1 can have at least one human-machine interface (not shown), connected or connectable to the monitoring electronics unit 9, via which it can be input which consumable material type and/or consumable material quantity has been loaded into the respective container 10.

Figure 2:
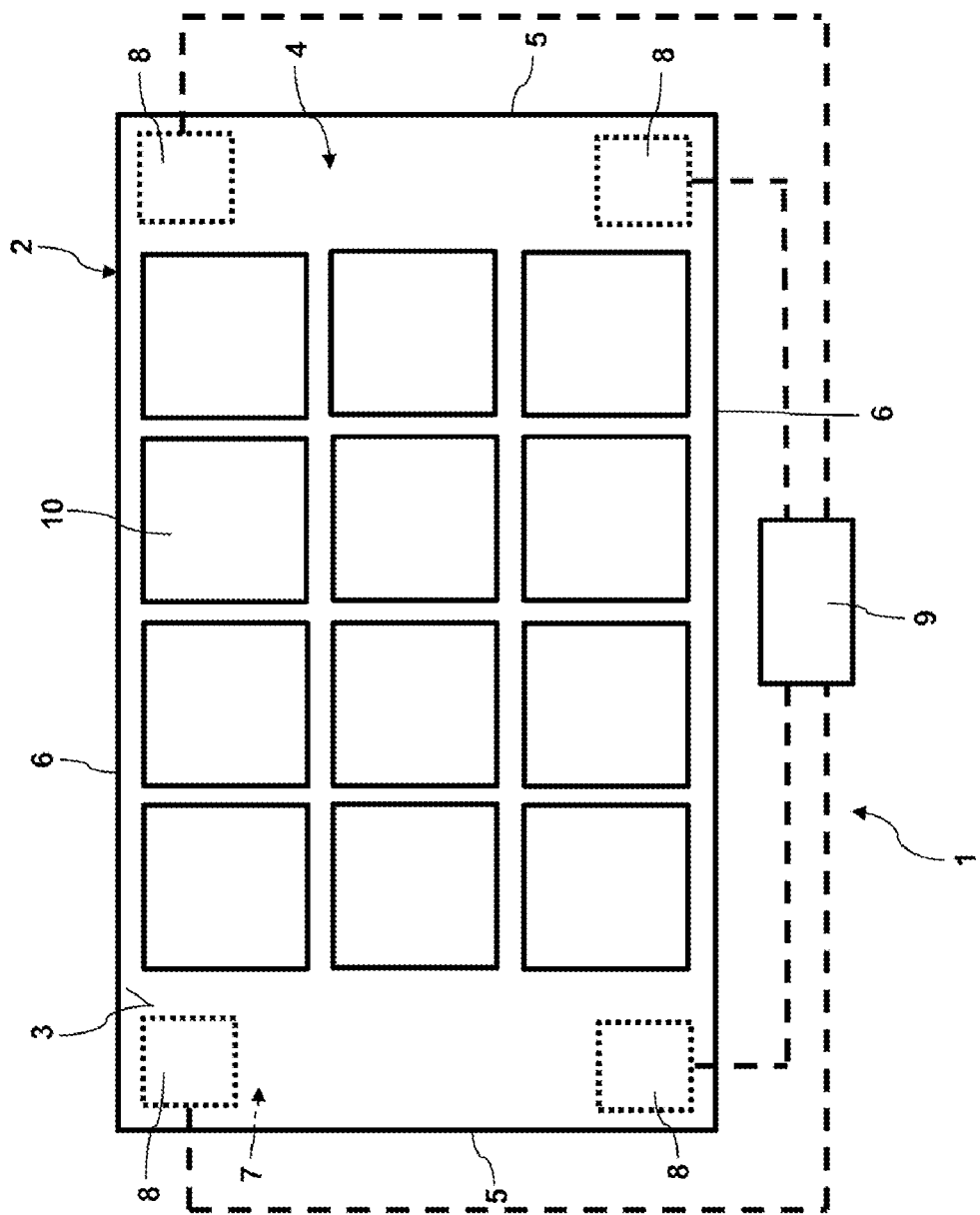
FIG. 2 shows a schematic illustration of a further exemplary embodiment of a system according to the disclosure.

FIG. 2 shows a schematic illustration of a further exemplary embodiment of a system 1 according to the disclosure for monitoring consumable material quantities (not shown).

The system 1 differs from the exemplary embodiment shown in FIG. 1 in that a weight sensor 8 is arranged at each corner region of the rectangular loading plate 2 and the containers 10 are arranged distributed like a matrix on a section of the loading plate 2 between groups in the form of pairs of weight sensors 8, which are arranged at the opposite narrow sides 5 of the loading plate 2. Each two weight sensors 8 are combined to form a group with respect to the plane of the drawing here. Thus, in the plane of the drawing, weight sensors 8 arranged at the left narrow side 5 are combined to form a group, wherein the weight sensors 8 arranged at the right narrow side 5 in the plane of the drawing are also combined to form a group. At the same time, the weight sensors 8 arranged at the lower long side 6 in the plane of the drawing are also combined to form a group, wherein the weight sensors 8 arranged at the upper long side 6 in the plane of the drawing, which is opposite thereto, are also combined to form a group. Each two weight sensors 8 are thus assigned to two different groups in each case, which as a result refines the monitoring. To avoid repetitions, reference is moreover made to the above description of FIG. 1.

Figure 3:
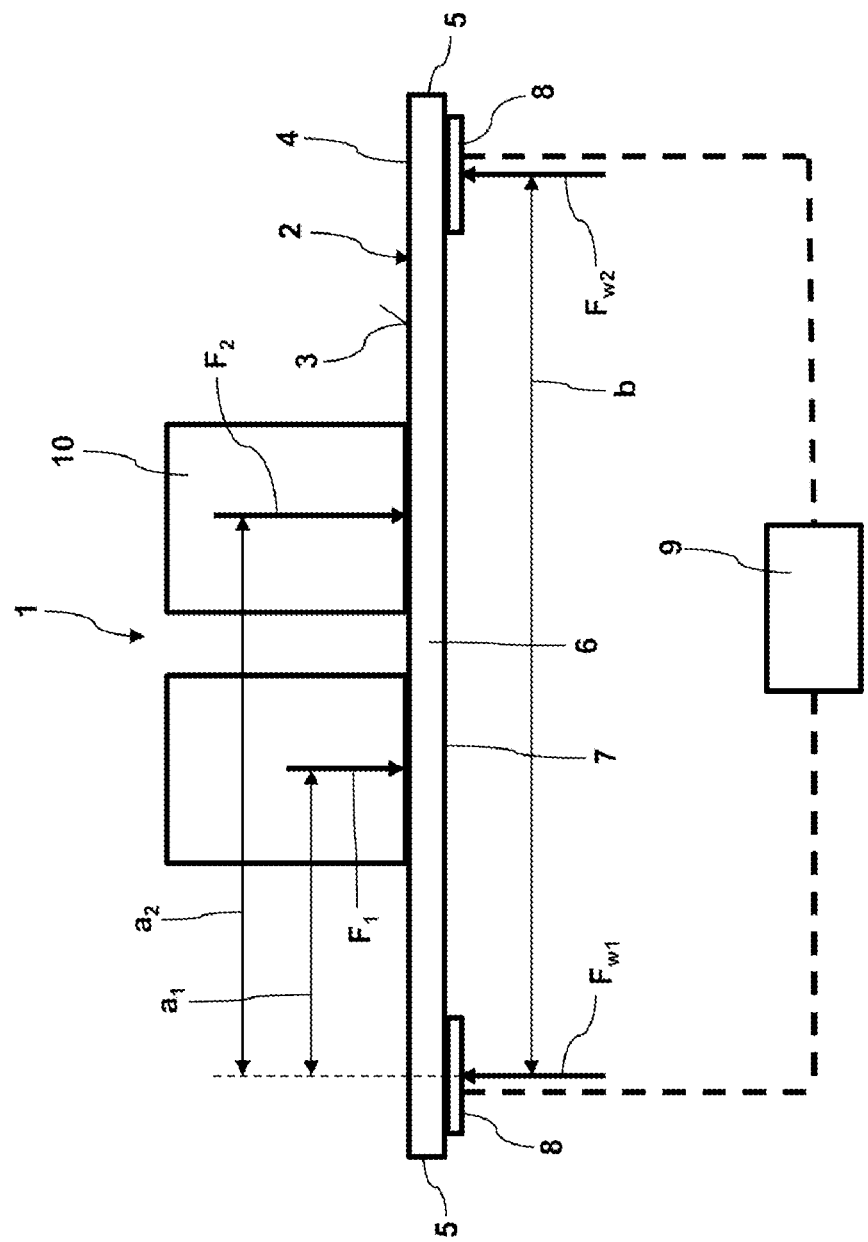
FIG. 3 shows a schematic side view of a system according to the disclosure from FIG. 1.

FIG. 3 shows a schematic side view according to FIG. 1 for a system 1 according to the disclosure for monitoring consumable material quantities (not shown) The system 1 essentially corresponds to the exemplary embodiment shown in FIG. 1, wherein only two containers 10 are provided for the sake of simplicity, however. The loading plate 2, the weight sensors 8, and the containers 10 are shown in a side view.

The consumable material (not shown) provided in the container 10 shown on the left in FIG. 3 generates a weight force $F_1$, while the consumable material (not shown) provided in the container 10 shown on the right in FIG. 3 generates a weight force $F_2$. The force $F_{w1}$ is measured by the weight sensor 8 shown on the left in the plane of the drawing in FIG. 3, while the force $F_{w2}$ is measured by the weight sensor 8 shown on the right in the plane of the drawing in FIG. 3. In this case, $F_1+F_2=F_{w1}+F_{w2}$ applies.

In FIG. 3, $a_1$ designates the distance between the weight force $F_1$ and the force $F_{w1}$, $a_2$ designates the distance between the weight force $F_2$ and the force $F_{w1}$, and b designates the distance between the forces $F_{w1}$ and $F_{w2}$. It follows therefrom for a torque acting on the weight sensor 8 shown on the left in FIG. 3 that: $M_{FW}=0=b \cdot F_{w2}-a_1 \cdot F_1-a_2 \cdot F_2$.

In the following, the situations will now be observed in which the weight force $F_2$ at the point in time t=0 is zero and at the later point in time t=1 is nonzero. From the above equations, for the point in time t=0: $F_1=F_{w1}+F_{w2}$ and $b \cdot F_{w2}=a_1 \cdot F_1$. It follows therefrom that:

$$\frac{a_1}{b} = \frac{F_{w2}(t=0)}{F_{w1}(t=0)+F_{w2}(t=0)}$$

At the point in time t=1, $F_1+F_2=F_{w1}(t=0)+\Delta F_{w1}+F_{w2}(t=0)+\Delta F_{w2}$. It follows therefrom that $F_2=\Delta F_{w1}+\Delta F_{w2}$ and $M_{FW}=0=b \cdot (F_{w2}(t=0)+\Delta F_{w1})-a_1 \cdot F_1-a_2 \cdot F_2(t=1)=b \cdot \Delta F_{w2}-a_2 \cdot F_2(t=1)$. It follows therefrom that:

$$\frac{a_2}{b} = \frac{\Delta F_{w2}}{\Delta F_{w1}+\Delta F_{w2}}$$

Figure 4:
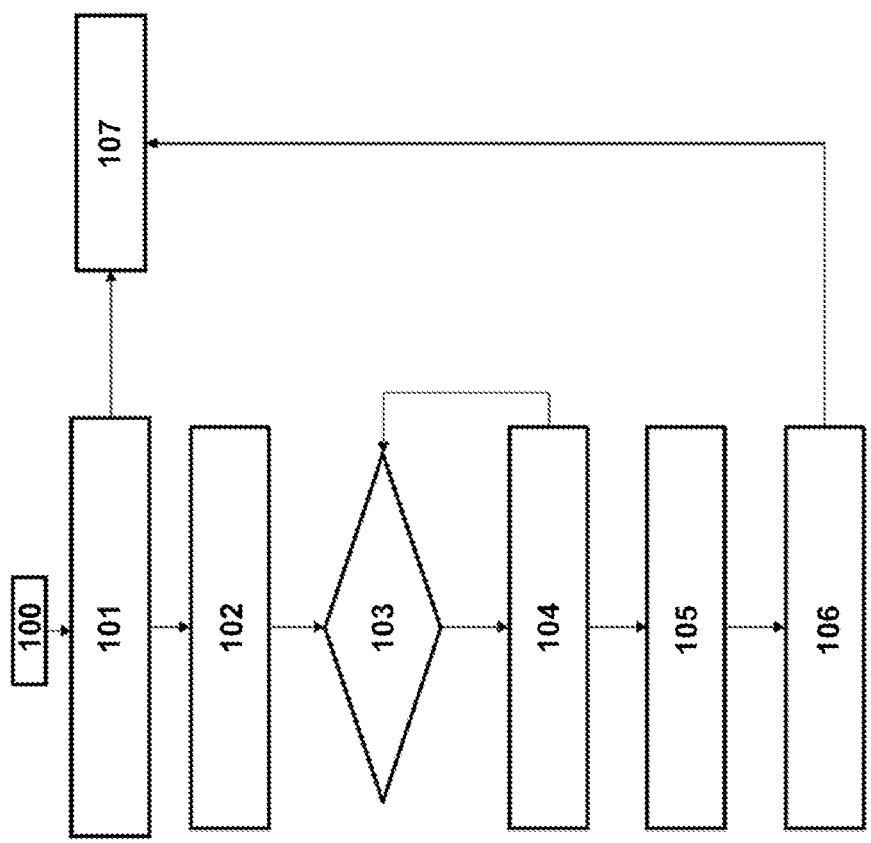
FIG. 4 shows a flow chart of an exemplary embodiment of a method according to the disclosure.

FIG. 4 shows a flow chart of an exemplary embodiment of the method according to the disclosure for monitoring consumable material quantities by means of at least one loading plate (not shown in FIG. 4), which has an upper side providing a loading surface, and two weight sensors (not shown in FIG. 4) arranged spaced apart from one another on a lower side of the loading plate. The loading plate and the weight sensors can be designed according to one of the exemplary embodiments according to FIGS. 1 to 3.

According to the method, a quantity of a consumable material is loaded into each of at least two containers (not shown in FIG. 4) arranged adjacent to one another on the upper side of the loading plate and it is ascertained from sensor signals of the weight sensors, generated before and after consumable material is taken from one of the containers, from which container the consumable material has been taken and/or which quantity of the consumable material has been removed.

For this purpose, the method is started in method step 100. Subsequently, a calibration of the system takes place in method step 101, wherein the weight forces $F_1(t=0)$ and $F_2(t=0)$ of the consumable material are provided. Optionally, in method step 101, a manual input of the weight forces of the consumable material in the containers can take place. In method step 102, a measurement and/or calculation and also temporary storage of the forces $F_{w1}(t=0)$ and $F_{w2}(t=0)$ measured by the weight sensors takes place.

In method step 103, it is checked whether a change of the forces $F_{w1}$ and/or $F_{w2}$ is present or not. If such a change is present, the new forces $F_{w1}(t=1)$ and $F_{w2}(t=1)$ are measured and/or calculated and temporarily stored in method step 104. If a change is present, in method step 105, the position of the container in which a weight change is present is ascertained and temporarily stored. The equation $$\frac{a_i}{b} = \frac{\Delta F_{w2}}{\Delta F_{w1} + \Delta F_{w2}}$$

is used here, wherein $a_i$ can be $a_1$ or $a_2$. These variables are known from the above description of the figure for FIG. 3 or from FIG. 3. The new forces $F_{w1}(t=1)$ and $F_{w2}(t=1)$ are then supplied back to method step 103 in order to continue the weight monitoring. If $a_i=a_1$, it follows that $F_1(t=1)=F_1(t=0)+\Delta F_{w1}+\Delta F_{w2}$ and $F_2(t=1)=F_2(t=0)$. If $a_i=a_2$, it follows that $F_1(t=1)=F_1(t=0)$ and $F_2(t=1)=F_2(t=0)+\Delta F_{w1}+\Delta F_{w2}$.

In method step 106, an assignment takes place of the respective detected force change to the container ascertained in method step 105. In method step 107, the weight display assigned to this container is updated, wherein previously the weight ascertained in method step 101 has been displayed.

With respect to the exemplary embodiment for FIG. 2, the forces of the two weight sensors 8 combined to form a group on the left narrow side 5 in the plane of the drawing of FIG. 2 are added and result in $F_{w1}$, wherein the forces of the two weight sensors 8 combined to form a group on the right narrow side 5 in the plane of the drawing of FIG. 2 result in $F_{w2}$, in order to ascertain $a_i$ in the x axial direction. Moreover, the forces of the two weight sensors 8 combined to form a group on the lower long side 6 in the plane of the drawing of FIG. 2 are added and result in $F_{w1}$, wherein the forces of the two weight sensors 8 combined to form a group on the upper long side 6 in the plane of the drawing of FIG. 2 result in $F_{w2}$, in order to ascertain $a_i$ in the y axial direction. The x axial direction is to be understood as extending in parallel to the long sides 6, wherein the y axial direction is to be understood as extending in parallel to the narrow sides 5.

In the equations and in FIG. 3, the signs have the following meaning:
$a_1$ distance between $F_1$ and $F_{w1}$
$a_2$ distance between $F_2$ and $F_{w1}$
b distance between $F_{w1}$ and $F_{w2}$
$F_1$ weight force
$F_2$ weight force
$F_{w1}$ force
$F_{w2}$ force

REFERENCE NUMBER LIST

1 system
2 loading plate
3 loading surface
4 upper side of 2
5 narrow side of 2
6 long side of 2
7 lower side of 2
8 weight sensor
9 monitoring electronics unit
10 container
100-107 method steps

What is claimed is:

1. A system for monitoring consumable material quantities, comprising:
    at least one loading plate having an upper side providing a loading surface;
    at least two weight sensors arranged spaced apart from one another on a lower side of the loading plate;
    at least one monitoring electronics unit connected or connectable to the weight sensors;
    at least two containers arranged adjacent to one another on the upper side of the loading plate, each for accommodating a quantity of a consumable material, wherein the monitoring electronics unit is configured to ascertain, from sensor signals of the weight sensors generated before and after consumable material is taken from one of the containers, from which container the consumable material has been taken and/or which quantity of the consumable material has been removed.

2. The system according to claim 1, wherein the containers are arranged in a row on a section of the loading plate lying between the weight sensors.

3. The system according to claim 1, wherein the loading plate is made rectangular, at least one weight sensor is arranged at each corner region of the loading plate, and the containers are arranged in a plane distributed on a section of the loading plate lying between groups of weight sensors, which are arranged at sides of the loading plate opposite to one another.

4. The system according to claim 1, wherein the monitoring electronics unit is configured to compare the ascertained quantity of the consumable material to a predetermined minimum value and to generate and output a messaging signal if the ascertained quantity of the consumable material falls below the minimum value.

5. The system according to claim 1, further including at least one human-machine interface connected or connectable to the monitoring electronics unit, via which the machine-human interface can receive input which consumable material type and/or consumable material quantity has been loaded into the respective container.

6. The system according to claim 1, wherein the monitoring electronics unit is configured for machine learning.

7. A method for monitoring consumable material quantities utilizing at least one loading plate, which has an upper side providing a loading surface, and at least two weight sensors arranged spaced apart from one another on a lower side of the loading plate, comprising:

loading a quantity of a consumable material into each of at least two containers arranged adjacent to one another on the upper side of the loading plate; and ascertaining from sensor signals of the weight sensors, generated before and after consumable material is taken from one of the containers, from which container the consumable material has been taken and/or which quantity of the consumable material has been removed.

8. The method according to claim 7, further comprising:

comparing the ascertained quantity of the consumable material to a predetermined minimum value; and generating a messaging signal is generated and output if the ascertained quantity of the consumable material falls below the minimum value.

9. The method according to claim 7, wherein the consumable material type and/or consumable material quantity loaded into the respective container is input via at least one human-machine interface.

\* \* \* \* \*